United States Patent
Weil et al.

(10) Patent No.: US 9,102,409 B2
(45) Date of Patent: Aug. 11, 2015

(54) DEVICE FOR RETRACTABLE TABLET AND SEAT

(75) Inventors: Arnaud Weil, Beauzelle (FR); Thomas Sobotta, Hamburg (DE)

(73) Assignee: AIRBUS, Blagnac (FR)

( * ) Notice: Subject to any disclaimer, the term of this patent is extended or adjusted under 35 U.S.C. 154(b) by 477 days.

(21) Appl. No.: 12/863,277

(22) PCT Filed: Jan. 14, 2009

(86) PCT No.: PCT/FR2009/000040
§ 371 (c)(1),
(2), (4) Date: Jul. 16, 2010

(87) PCT Pub. No.: WO2009/112673
PCT Pub. Date: Sep. 17, 2009

(65) Prior Publication Data
US 2011/0011979 A1  Jan. 20, 2011

(30) Foreign Application Priority Data
Jan. 17, 2008  (FR) ...................................... 08 50297

(51) Int. Cl.
| | |
|---|---|
| *A47B 83/02* | (2006.01) |
| *B64D 11/06* | (2006.01) |
| *A47C 1/121* | (2006.01) |
| *B60N 3/00* | (2006.01) |
| *A47C 7/70* | (2006.01) |
| *B60N 2/30* | (2006.01) |
| *B64D 11/00* | (2006.01) |
| *A47C 4/04* | (2006.01) |

(52) U.S. Cl.
CPC ................ *B64D 11/06* (2013.01); *A47C 1/121* (2013.01); *A47C 7/70* (2013.01); *B60N 2/305* (2013.01); *B60N 3/001* (2013.01); *B60N 3/002* (2013.01); *B64D 11/0638* (2014.12); *A47C 4/04* (2013.01); *B64D 11/0007* (2013.01)

(58) Field of Classification Search
USPC ..................... 297/144, 162, 154, 155, 188.08
See application file for complete search history.

(56) References Cited

U.S. PATENT DOCUMENTS

| | | | | |
|---|---|---|---|---|
| 119,344 A | * | 9/1871 | Glynn et al. | ................... 297/236 |
| 2,284,498 A | * | 5/1942 | Tucker | ............................ 297/39 |

(Continued)

FOREIGN PATENT DOCUMENTS

| | | | | |
|---|---|---|---|---|
| DE | 3116915 A1 | * | 11/1982 | ............... A47C 7/68 |
| EP | 0 071 670 | | 2/1983 | |

(Continued)

*Primary Examiner* — David E Allred
(74) *Attorney, Agent, or Firm* — Oblon, McClelland, Maier & Neustadt, L.L.P.

(57) ABSTRACT

A stowable table device for a foldable seat, the seat including a first mobile portion defining a seating portion and a second portion defining the back, the mobile portion having a first folded position and a second unfolded position. The stowable table includes a plate. The device further includes an arm movably attached to the seat by one end thereof, and a linking part movably attached to the arm by the other end thereof and to the plate so that, in a stowed position, the plate is substantially located against a first surface of the mobile part of the seat independently from the position of the mobile part, and in an unfolded position, the structure is located opposite a second surface of the mobile part of the seat and substantially parallel to the second surface, the first and second surfaces of the mobile part of the sheet being substantially parallel.

7 Claims, 10 Drawing Sheets

(56) References Cited

U.S. PATENT DOCUMENTS

| | | | |
|---|---|---|---|
| 2,954,073 A * | 9/1960 | Junkunc | 297/36 |
| 3,197,253 A * | 7/1965 | Brown | 297/36 |
| 3,717,375 A * | 2/1973 | Slobodan | 297/162 |
| 5,564,779 A * | 10/1996 | Tolbert et al. | 297/144 |
| 6,454,349 B1 | 9/2002 | Konya | |
| 6,598,934 B1 * | 7/2003 | Anderson | 297/162 |
| 7,500,689 B2 * | 3/2009 | Pasternak et al. | 280/304.1 |
| 7,509,696 B2 * | 3/2009 | Soto et al. | 5/507.1 |
| 2002/0003361 A1 | 1/2002 | Duerr et al. | |
| 2003/0030307 A1 * | 2/2003 | Richardson | 297/162 |
| 2004/0056160 A1 * | 3/2004 | Smallhorn | 248/126 |
| 2005/0140186 A1 * | 6/2005 | Piretti | 297/162 |
| 2005/0184566 A1 * | 8/2005 | Baumann et al. | 297/248 |
| 2007/0052263 A1 * | 3/2007 | Baumann | 297/146 |
| 2012/0091764 A1 * | 4/2012 | Cailleteau et al. | 297/162 |
| 2012/0223548 A1 * | 9/2012 | Sharber et al. | 297/161 |

FOREIGN PATENT DOCUMENTS

| | | | | |
|---|---|---|---|---|
| EP | 0 385 861 | | 9/1990 | |
| EP | 1 160 125 | | 12/2001 | |
| EP | 1 566 335 | | 8/2005 | |
| GB | 734 979 | | 8/1955 | |
| GB | 2240711 A | * | 8/1991 | A47D 1/02 |
| JP | 06191338 A | * | 7/1994 | B60N 3/00 |
| WO | 2004 005069 | | 1/2004 | |

* cited by examiner

DEVICE FOR RETRACTABLE TABLET AND SEAT

This invention relates to shelves for seats and more particularly a device for a folding-seat retractable shelf, in particular for seats for aircraft flight personnel.

In general, commercial airplanes are equipped with seats for passengers, each seat incorporating a shelf. Such shelves may be used in particular for setting down a tray meal, a computer or documents. In this way they enable passengers to perform certain tasks.

Depending on the arrangement and the features of the seats, the shelves are mounted against the backs of the seats (each passenger may use the shelf mounted on the seat installed in front of him), on the partitions facing the passengers or in the armrests. For reasons of safety and space, these shelves are retractable and must not be used during certain flight phases, for example during takeoff and landing.

There also are folding seats for passengers, the armrests of which comprise spaces for accommodating a removable shelf, such as described in patent GB 734 979.

Furthermore, commercial airplanes generally have seats for the crew members, different from the seats for passengers. These seats are used mainly during certain flight phases such as takeoff and landing or during turbulence. These seats often are arranged facing the passengers to enable the crew members to intervene in case of need. With a view to optimization of the space and because of a more limited use, these seats generally are folding.

Figure 1:
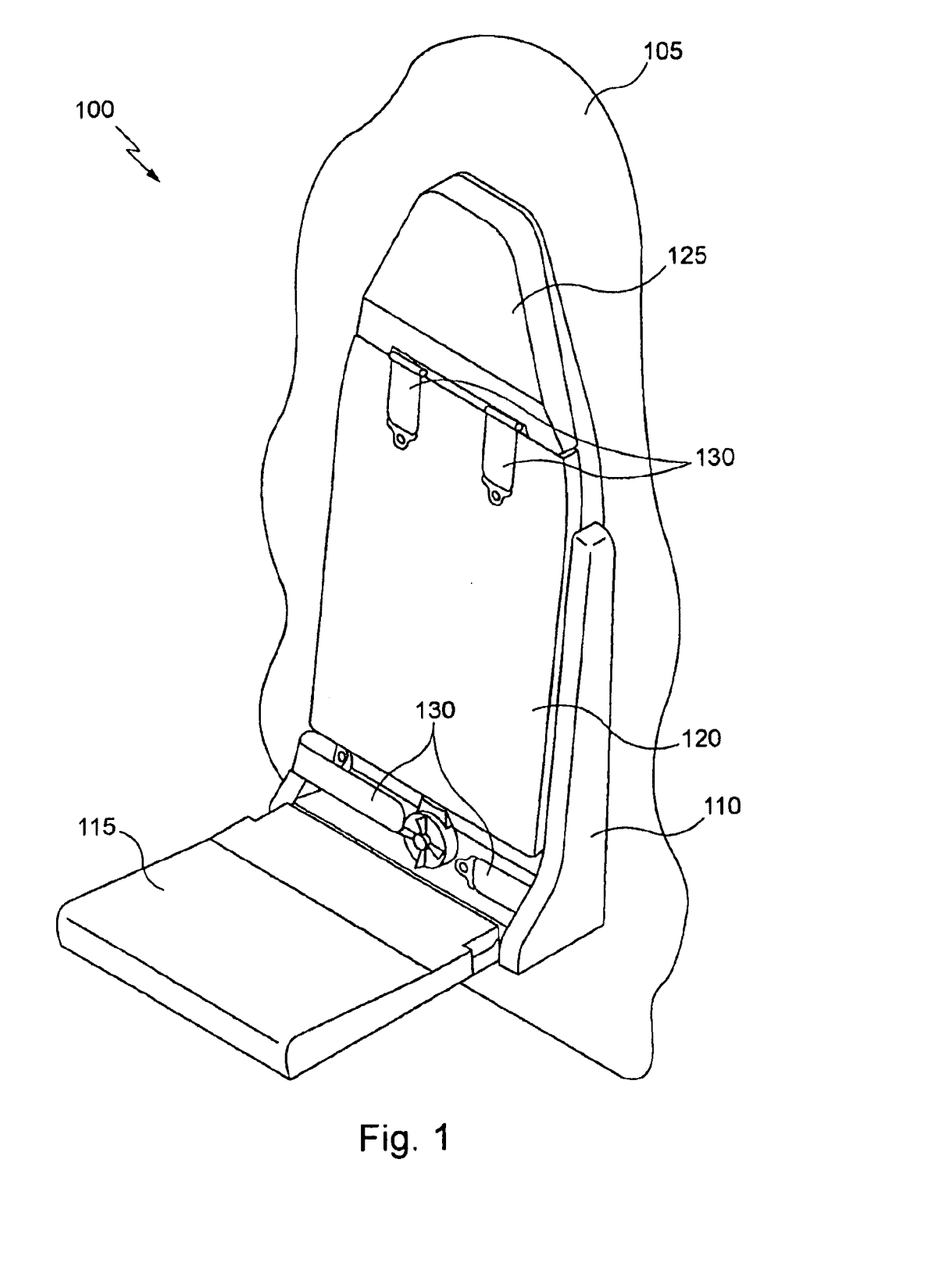
FIG. 1 schematically shows a standard seat for a crew member of an aircraft.

FIG. 1 illustrates an exemplary seat for a crew member of an aircraft. As illustrated, seat 100 here is mounted against a wall 105 of the aircraft. Seat 100 comprises a structure 110 to which there are fastened a first part and a second part 115 and 120, forming the sitting surface and the back of the seat, respectively. Part 115 is fastened movably around a horizontal axis parallel to back 120 so that part 115 has a folded vertical position and a horizontal use position, as illustrated. Seat 100 also comprises a headrest 125 and a seat-belt system 130.

While it often has been considered that the crew members did not have any use for a shelf by reason of their functions, a need therefor exists nowadays, in particular for the performance of administrative tasks. In particular by reason of their arrangement, however, these seats are not provided with such shelves and those used for the passengers cannot be adapted to the folding seats for the crew members.

The invention makes it possible to resolve at least one of the problems set forth above.

The invention thus has as an object a retractable shelf device for a folding seat, the said seat comprising a first movable part forming a sitting surface and a second part forming a back, the said movable first part having a first folded position more or less parallel to the said second part and a second opened-out position forming an angle with the said second part, this device comprising the following means,
  tray;
  arm comprising, at one of its ends, means for movable fastening to the said seat;
  connecting piece movably fastened to the said arm, by its other end, and to the said tray so that, when the said arm is movably fastened to the said seat, the said tray is, in a retracted position, more or less against a first face of the said first movable part, irrespective of the position of the said first movable part, and the said tray is, in an opened-out position of the said tray and of the said first movable part, opposite a second face of the said first movable part, more or less parallel to the said second face, the said first and second faces of the said movable part of the said seat being more or less parallel.

In this way the device according to the invention makes it possible to combine a retractable shelf with a folding seat so as to allow the user of the folding seat to be able to enjoy a shelf, the shelf not forming an obstacle to movement around the seat when the latter is folded.

According to one embodiment, the said means for movable fastening to the said seat are adapted for cooperating with the said first movable part of the said seat. The shelf using the device according to the invention thus provides a good stability and easily may be retracted or lowered.

According to another embodiment, the said means for movable fastening to the said seat are adapted for cooperating with the said second part of the said seat. In this way, the shelf using the device according to the invention may be mounted easily on folding seats not designed to accommodate retractable shelves by modifying only the sitting surface.

Advantageously, the device further comprises guidance means adapted for guiding the said tray against the said first movable part, when the said arm is movably fastened to the said seat, in order to facilitate the operations of retraction and opening out of the shelf.

According to a specific embodiment, the device according to the invention preferably further comprises at least one stop adapted for holding the said tray in a predetermined position.

Still according to a specific embodiment, the device further comprises holding means adapted for holding the said arm in a predetermined position making it possible, for example, to prevent the shelf from being retracted accidentally.

Advantageously, the device further comprises elastic means adapted for favoring the movement of the said arm along a predetermined direction in order to limit stresses during handling of the shelf.

Advantageously, the device further comprises fastening means adapted for cooperating with at least one cylindrical component for the assembly of the said connecting component allowing an easy set-up and dismantling of at least some components making up the device.

The device preferably further comprises retention means adapted for holding the said tray, in the said retracted position, against the said first movable part of the said seat, when the said arm is movably fastened to the said seat, in order to prevent same from opening out accidentally.

The invention also has as an object a folding seat for commercial aircraft flight personnel including the device described above, the device being incorporated into the seat. The folding seat according to the invention thus comprises a retractable shelf allowing the user of the seat to be able to enjoy a shelf, the shelf not forming an obstacle to movement around the seat when the latter is folded.

Other advantages, purposes and features of this invention emerge from the detailed description that follows, provided by way of non-limitative example, with reference to the attached drawings in which:

FIG. 2, comprising

FIG. 3, comprising

FIG. 4, comprising

FIG. 5, comprising

FIG. 6, comprising

FIG. 7, comprising

FIG. 8, comprising

FIG. 10, comprising

FIG. 11, comprising

FIG. 12, comprising

The invention has as an object a retractable-shelf device for a folding seat, according to which the shelf may be retracted under the sitting surface of a seat when same is opened out, that is to say on the visible face of the sitting surface when the latter is folded.

It is assumed in the remainder of the description that the upper part of the sitting surface is the part on which it is possible to sit down and that the lower part of the sitting surface is the part opposite the upper part; the lower part therefore is visible when the sitting surface is folded. Likewise, the front edge of the sitting surface is the edge opposite the one that is against the back and the sides are the edges disposed between the front edge and the one that is against the back.

Figure 2A:
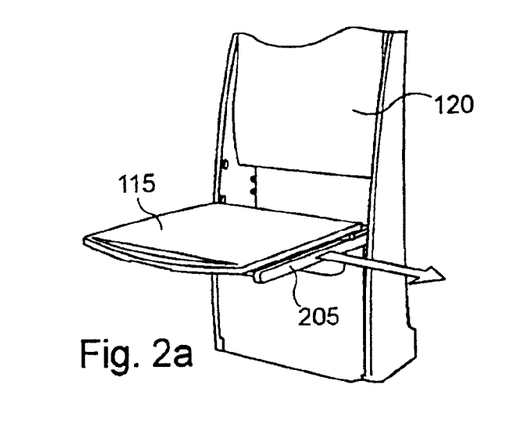
FIGS. 2a to 2e, illustrates an exemplary retractable shelf for a folding seat according to a first embodiment.
Figure 2B:
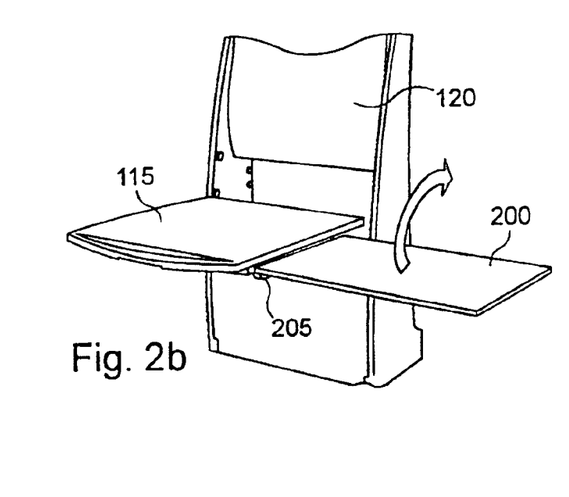
Figure 2C:
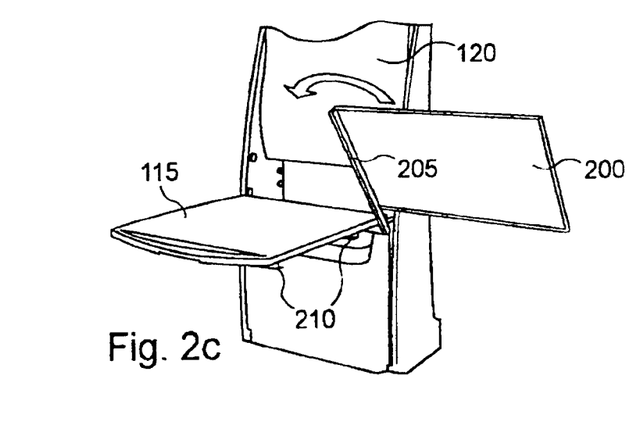
Figure 2D:
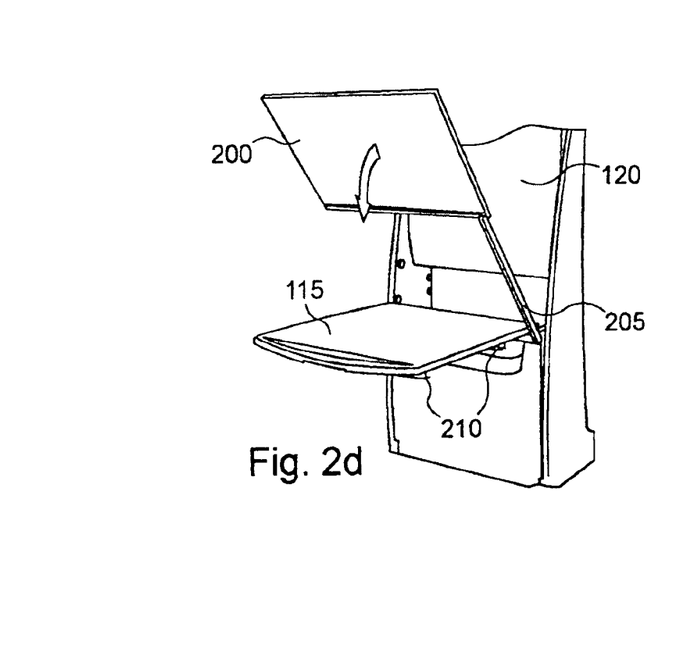
Figure 2E:
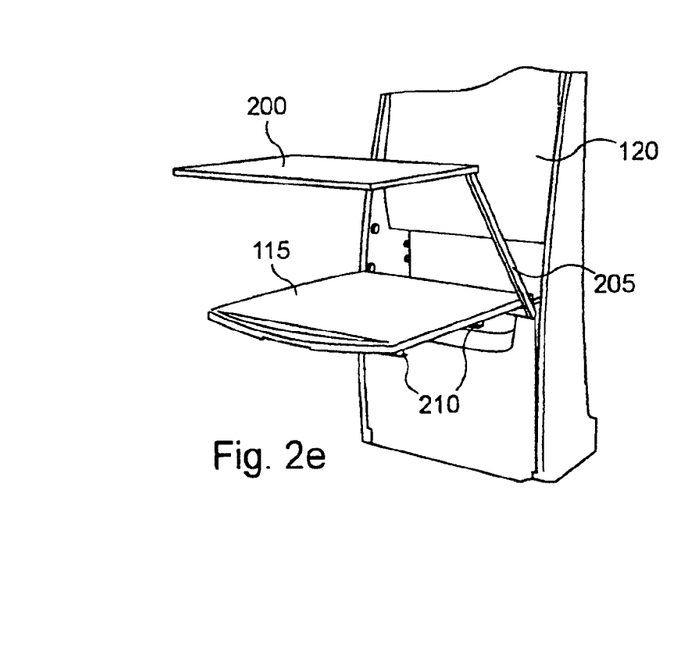

FIG. 2, comprising FIGS. 2a and 2e, illustrates an exemplary retractable shelf for a folding seat according to a first embodiment. FIG. 2a shows the seat in its opened-out position when the shelf in accordance with the invention is retracted, while FIG. 2e shows the seat in the same position when the shelf is opened out. FIGS. 2b to 2d illustrate the opening-out principle of the shelf.

For the sake of clarity, the references for the folding seat here and on the following Figures are in accordance with the numbering used on FIG. 1. Thus, although some of these components may be modified to accommodate a retractable shelf, according to the embodiments, the folding seat including a retractable shelf comprises, whatever the embodiment may be, a structure 110, a sitting surface 115 and a back 120.

The shelf comprises a tray 200 and an arm 205. Tray 200 basically comprises two parallel faces, one forming the work surface of the shelf, that is to say the surface on which it is possible to set down objects when the shelf is opened out. For the sake of clarity, the tray of the shelf bears the reference 200 whatever the embodiment may be. The arm basically comprises a body with elongated shape. The arm is used to hold the tray in place when the shelf is opened out.

Tray 200 is movably fastened to arm 205 which itself is movably fastened to the seat, here to sitting surface 115. In this example, one of the ends of the arm is fastened to the side of the sitting surface, near the back, the arm being able to be moved in a plane perpendicular to the plane of sitting surface 115 going over the side of the sitting surface.

The fastening of the arm on the sitting surface is such that the arm may have a rotating movement along a more or less horizontal axis more or less parallel to the back of the seat. For that, the arm comprises, for example, a cylindrically-shaped projecting part, perpendicular to the body of the arm, adapted for cooperating with a cylindrical opening formed on the side of the sitting surface. It is considered here, as well as in the remainder of the description, that a cylindrical component preferably is a component having a form of a cylindrical solid of revolution. The projecting part of the arm may be held in place in the cylindrical opening with the aid of a fastening component comprising a pin and a collar, as illustrated on FIG. 12.

The fastening of the arm to the tray here allows a translatory movement as well as rotating movements along two axes. This dual rotating and translatory movement may be accomplished with the aid of a connecting piece comprising a cylindrical opening, inserted into an opening formed at the end of the arm and held by a cylindrical component, as illustrated on FIG. 7. This connecting piece advantageously further includes a cylindrical projecting part the end of which has a diameter greater than its body. This projecting part is adapted for cooperating with an oblong opening formed in the tray to allow a rotating and translatory movement.

The sitting surface of the seat also comprises, on its lower face, a guidance component 210 to guide tray 200 when the latter is pulled out or folded against the sitting surface. The guidance component here is made up of two L-shaped rails, opposite one another, in which the tray may slide.

FIG. 2a shows the seat in its opened-out position when tray 200 of the shelf is retracted under sitting surface 115 of the seat. In this configuration, arm 205 of the shelf is in a folded position, along the edge of sitting surface 115 of the seat.

The tray may be pulled out from sitting surface 115 by pulling it in a horizontal plane, on the arm side, as illustrated on FIGS. 2a and 2b, to release it from the sitting surface. The tray slides along guidance component 210 and arm 205.

It then is possible to have the arm pivot around an axis parallel to sitting surface 115 and perpendicular to the body of arm 205, that is to say around the axis of the cylindrical component forming the connection between sitting surface 115 and arm 205 as illustrated on FIGS. 2b and 2c, to position the arm in a position allowing the use of the shelf. The arm may be held in a predetermined high position, as illustrated in FIG. 2c, with the aid of a standard mechanism, for example a device similar to those illustrated on FIGS. 5 and 6.

Tray 200 then may be brought back over sitting surface 115 by a rotating movement of approximately 180° around an axis more or less perpendicular to tray 200 and arm 205. This rotating movement is illustrated by FIGS. 2c and 2d.

The tray then may be folded back in a more or less horizontal plane by a rotation along an axis more or less parallel to tray 200 and perpendicular to arm 205. The mechanism for rotation around this axis preferably comprises a stop so that tray 200 is held in a more or less horizontal position. This rotating movement is illustrated by FIGS. 2d and 2e.

FIG. 2e shows the seat in its opened-out position when the shelf is usable.

Stowing of the shelf preferably is accomplished according to the same steps as those implemented for opening out the shelf, in reverse.

It should be observed here that the movement of tray 200 and arm 205 is not linked to the position of sitting surface 115, all the pieces of the shelf being linked only to sitting surface 115.

It also should be noted that the arrangement of the pieces may be different. In particular, sitting surface 115 may comprise an opening having approximately the size of tray 200, formed on the side of the sitting surface and adapted for accommodating it when same is folded.

Figure 3A:
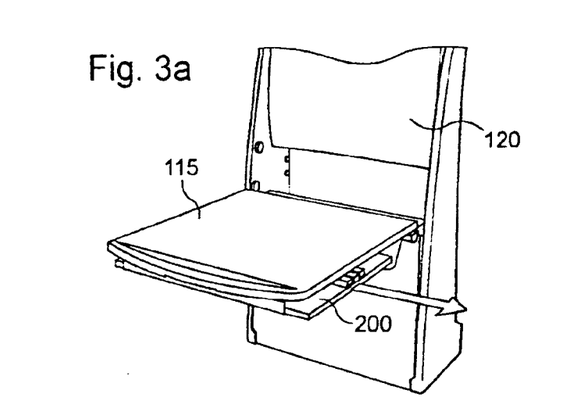
FIGS. 3a to 3d, illustrates an exemplary retractable shelf for a folding seat according to a second embodiment.
Figure 3B:
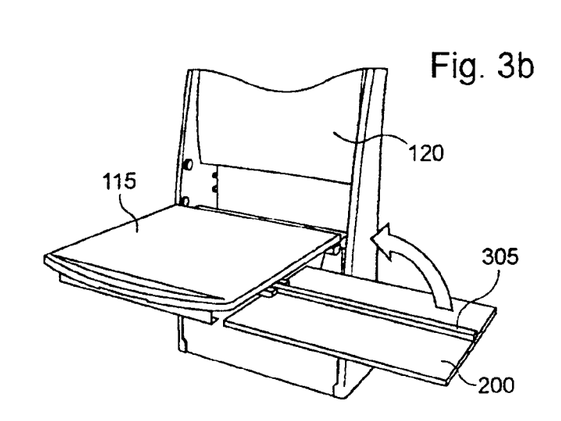
Figure 3C:
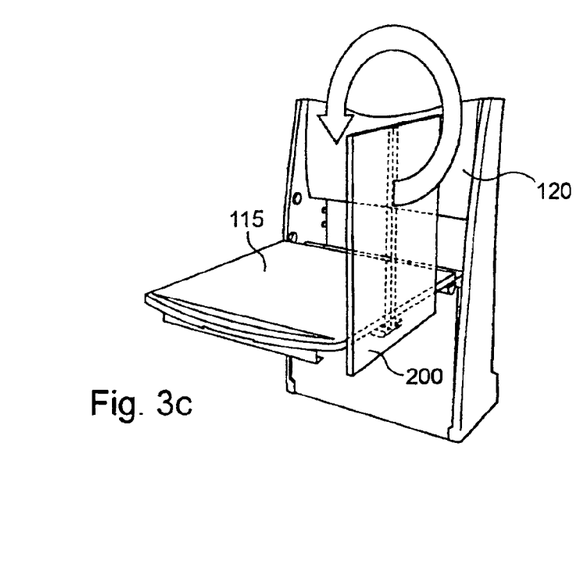
Figure 3D:
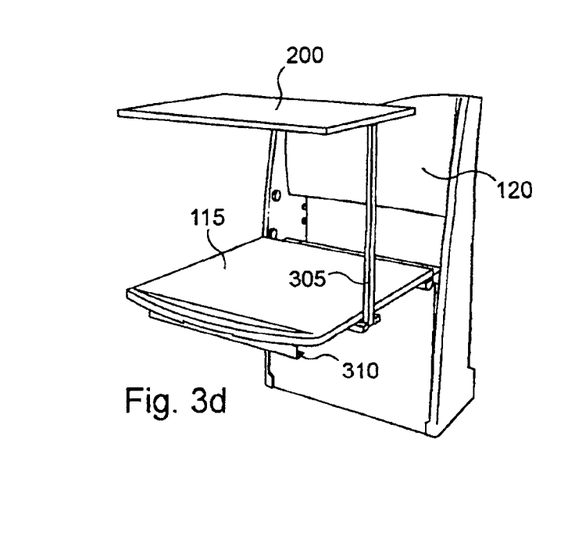

FIG. 3, comprising FIGS. 3a to 3d, illustrates an exemplary retractable shelf for a folding seat according to a second embodiment. FIG. 3a shows the seat in its opened-out position when the shelf in accordance with the invention is retracted, while FIG. 3d shows the seat in the same position when the shelf is opened out. FIGS. 3b and 3c illustrate the opening-out principle of the shelf.

As in the example illustrated on FIG. 2, the shelf comprises a tray 200 and an arm 305. Tray 200 is movably fastened to arm 305 which itself is movably fastened to the seat, here sitting surface 115. In this example, one of the ends of the arm is fastened on the side of the sitting surface, for example in the middle thereof. Arm 305 is movable in a plane more or less perpendicular to sitting surface 115 and more or less parallel to the front edge of the sitting surface (that is to say to the back when the sitting surface is opened out).

The fastening of the arm to the sitting surface is such that the arm may have a translatory movement along an axis more or less parallel to the front edge of the sitting surface and a rotating movement along an axis more or less horizontal and more or less perpendicular to the back of the seat, when sitting surface 115 is opened out. For that, the arm comprises, for example, a projecting part of cylindrical or spherical shape, extending on each side thereof, adapted for cooperating with a rail (not shown).

The fastening of the arm to the tray allows a rotating movement around an axis perpendicular to arm 305 and parallel to tray 200. This movement may be accomplished with the aid of a U-shaped connecting piece, fastened to tray 200, into which arm 305 which is held by a cylindrical component is inserted.

The sitting surface of the seat further comprises a guidance component 310 to guide tray 200 when the latter is pulled out or folded against the sitting surface. The guidance component here is made up of two L-shaped rails, opposite one another, in which tray 200 may slide.

FIG. 3a shows the seat in its opened-out position when tray 200 of the shelf is retracted under sitting surface 115 of the seat. In this configuration, arm 305 of the shelf is in a folded position, under sitting surface 115 of the seat in a plane more or less parallel to the front edge of the sitting surface.

After having opened out sitting surface 115 of the seat, it is possible to pull out the tray by pulling it in a horizontal plane, as illustrated on FIGS. 3a and 3b, to release it from the sitting surface. The tray slides along guidance component 310 while arm 305 slides along the rail to which it is linked.

It then is possible to have the whole formed by tray 200 and arm 305 pivot around an axis more or less parallel to the side of the sitting surface as illustrated on FIGS. 3b and 3c to position the arm in a position allowing the use of the shelf. The angle formed between arm 305 and sitting surface 115 preferably is less than 90° so that the arm is held in place by simple gravity.

Tray 200 then may be tilted over sitting surface 115, by a rotating movement of approximately 270° around an axis more or less parallel to the side of tray 200 and perpendicular to arm 305. This rotating movement is illustrated by FIGS. 3c and 3d. The mechanism for rotation around this axis preferably comprises a stop so that tray 200 is held in a more or less horizontal position.

FIG. 3d shows the seat in its opened-out position when the shelf is usable.

Stowing of the shelf preferably is accomplished according to the same steps as those implemented for opening out the shelf, in reverse.

Figure 4A:
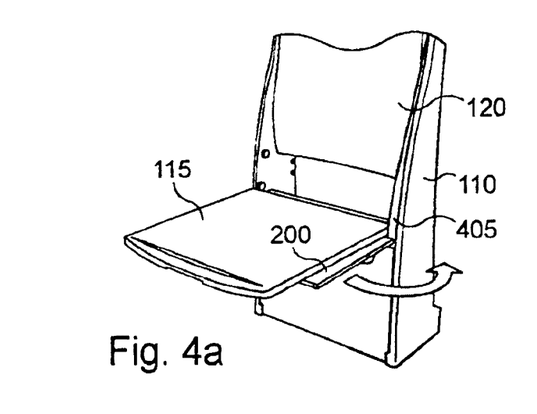
FIGS. 4a to 4d, illustrates an exemplary retractable shelf for a folding seat according to a third embodiment.
Figure 4B:
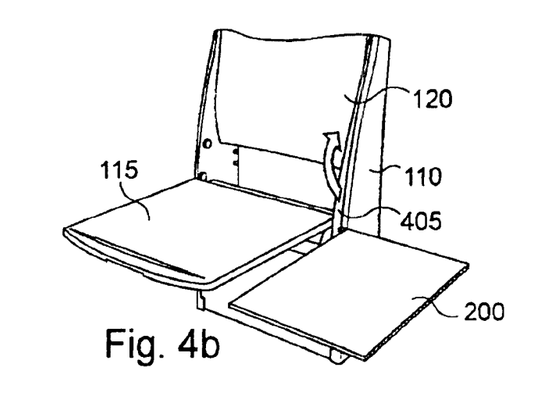
Figure 4C:
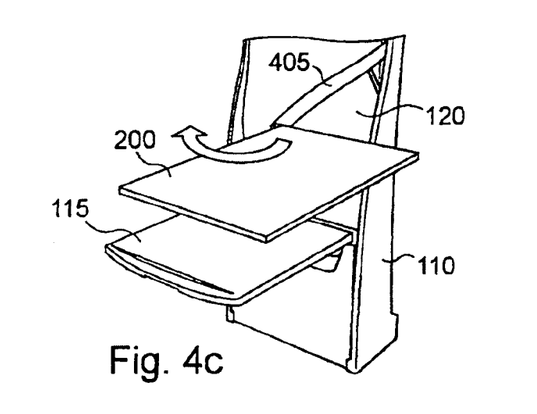
Figure 4D:
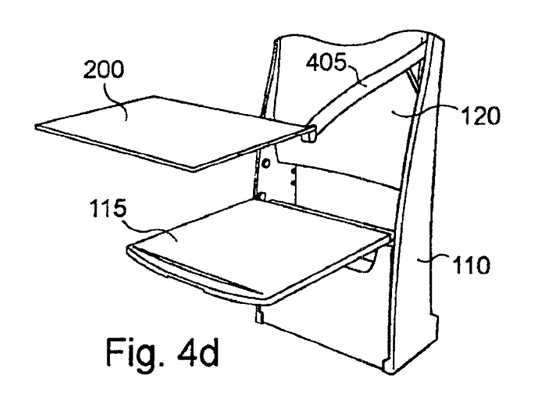

FIG. 4, comprising FIGS. 4a to 4c, illustrates an exemplary retractable shelf for a folding seat according to a third embodiment. FIG. 4a shows the seat in its opened-out position when the shelf according to the invention is retracted, while FIG. 4d shows the seat in the same position when the shelf is opened out. FIGS. 4b and 4c illustrate the opening-out principle of the shelf.

As in the preceding examples, the shelf comprises a tray 200 and an arm 405. Tray 200 is movably fastened to arm 405 which itself is movably fastened to the seat. In this example, one of the ends of the arm is fastened to the side of the back, for example in the middle of the structure 110 of the seat, the arm being able to be moved in a plane perpendicular to the plane of sitting surface 115 going over the side of sitting surface 115.

The fastening of the arm to the back is such that the arm may have a rotating movement along an axis more or less horizontal and more or less parallel to the back of the seat. For that, the arm, preferably adapted for being inserted into an opening formed in the structure of the seat, comprises, for example, a cylindrical opening able to be aligned with one or more equivalent cylindrical openings formed in the structure, a cylindrical component being placed in these aligned openings for movably linking the arm to the structure of the seat.

The fastening of the arm to the tray allows a rotating movement along two axes. This dual movement may be accomplished with the aid of a connecting piece fastened to the end of the arm, such as that illustrated on FIG. 7.

This connecting piece advantageously includes a narrow part adapted for being inserted into a hollow space formed at the end of arm 405, this narrow part comprising a cylindrical hole adapted for accommodating a cylindrical component allowing a fastening of this component on arm 405, movable in rotation around the axis of the cylindrical component.

The connecting piece here also comprises a cylindrical projecting part adapted for cooperating with a cylindrical hole formed in tray 200 for fastening it to the connecting piece while allowing a rotating movement around the axis of this cylindrical projecting part.

The sitting surface of the seat preferably further comprises a retention component (not shown) for holding tray 200 in place when the latter is stowed. Such a retention component, placed under sitting surface 115, is illustrated on FIG. 11.

FIG. 4a shows the seat in its opened-out position when tray 200 of the shelf is retracted under sitting surface 115 of the seat. In this configuration, arm 405 of the shelf is in a "stowed" position, along the edge of back 120 of the seat, along or in structure 110.

After having opened out sitting surface 115 of the seat, it is possible to pull out the tray by having it turn around the cylindrical projecting part of the connecting piece, as illustrated on FIGS. 4a and 4b, to release it from the sitting surface.

It then is possible to have the arm pivot around the axis connecting arm 405 to structure 110 of the seat, as illustrated in FIGS. 4b and 4c to position the arm in a position allowing the use of the shelf.

The arm may be held in a predetermined high position, as illustrated on FIG. 4c, with the aid of a standard mechanism, for example one of the devices illustrated on FIGS. 5 and 6.

Tray 200 then may be brought back over sitting surface 115 by a rotating movement of approximately 90° around the axis of the cylindrical projecting part of the connecting piece. The mechanism for rotation around this axis preferably comprises a stop so that tray 200 is held in a more or less horizontal position. This rotating movement is illustrated by FIGS. 2c and 2d.

FIG. 2d shows the seat in its opened-out position when the shelf is usable.

Stowing away of the shelf preferably is accomplished according to the same steps as those implemented for opening out the shelf, in reverse.

Alternatively, the fastening of tray 200 to arm 405 may be movable according to a translatory movement such as that shown on FIG. 2.

Figures 5A, 5B, 6A, 6B:
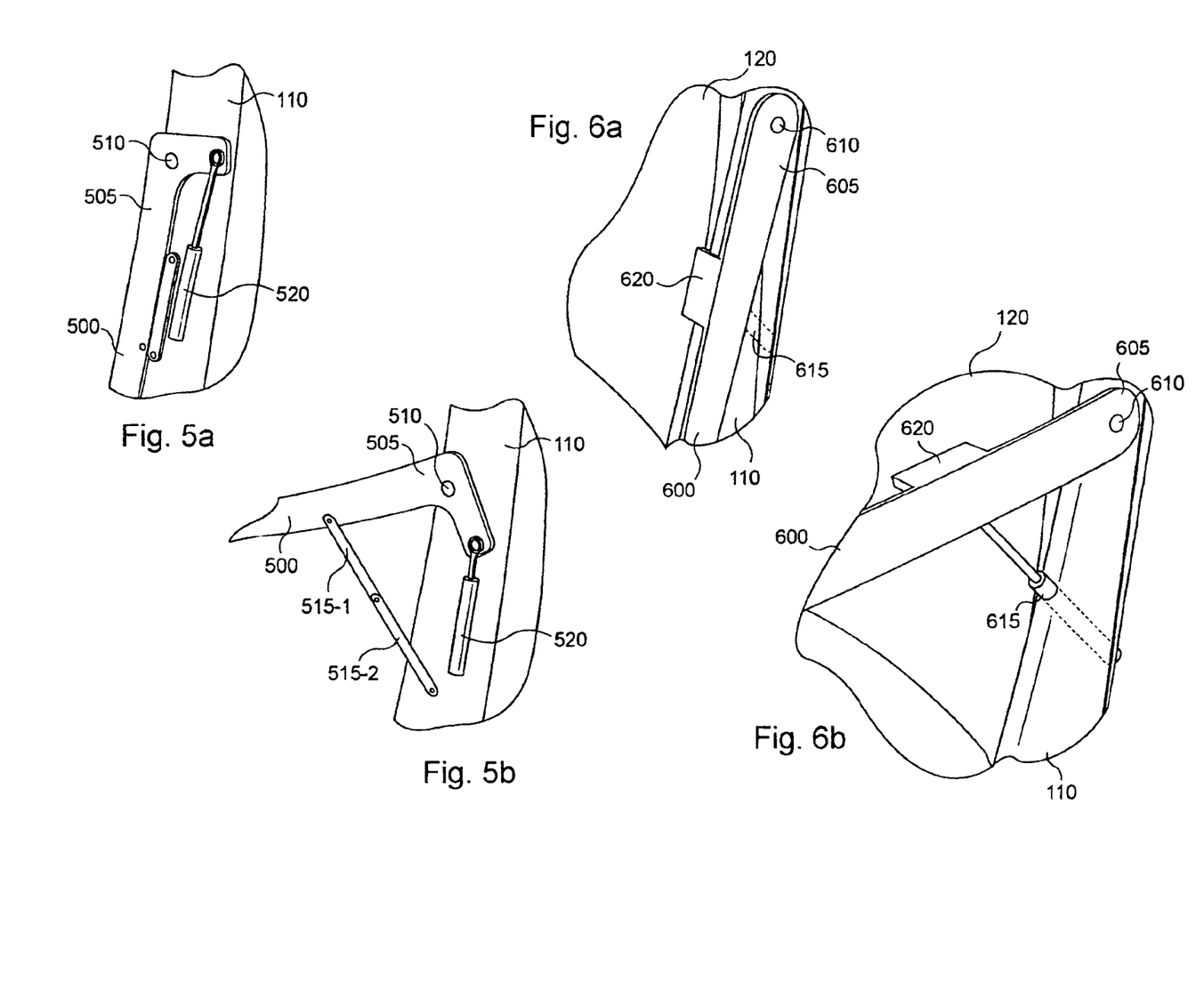
FIGS. 5a and 5b, illustrates a first exemplary connection between the arm of a shelf in accordance with the invention and the back of a seat.
FIGS. 6a and 6b, illustrates a second exemplary connection between the arm of a shelf in accordance with the invention and the back of a seat.

FIG. 5, comprising FIGS. 5a and 5b, illustrates a first exemplary connection between the arm of a shelf in accordance with the invention and the back of a seat. FIG. 5a shows the arm in a stowed position of the shelf, while FIG. 5b shows the arm in a use position of the shelf.

End 505 of arm 500, fastened to structure 110 of a seat, here has an inverted-L shape. Rotation point 510 of arm 500 is located approximately at the intersection of the two bars of the L.

One holding bar comprising two parts 515-1 and 515-2 linked together by one of their ends, is connected by the other ends to arm 500 and to back 120, as illustrated. The connections of parts 515-1 and 515-2 allow a movement along parallel axes.

When arm 500 is in the position allowing use of the shelf, parts 515-1 and 515-2 of the holding bar are aligned and hold the arm in its position. To improve the stability of the position of arm 500, a stop may be mounted on one of parts 515-1 and 515-2. To lower the arm, it may be necessary to change the alignment of parts 515-1 and 515-2 manually.

Advantageously, a spring combined with a gas shock absorber, called a combined unit 520, is used to facilitate opening out of the arm and to ward off abrupt movements linked to the users and/or to the environment. One end of this combined unit 520 is fastened to the structure of the seat, while the other end is fastened to arm 500, preferably at the end of the small bar of the L, as shown. The spring of combined unit 520 is compressed when the shelf is folded and relaxed when the latter is in use position. In this way, the force of the spring makes it possible to facilitate the movement of the arm.

This system may be fastened to the side of the structure of the seat or in the structure itself.

FIG. 6, comprising FIGS. 6a and 6b, illustrates a second exemplary connection between the arm of a shelf in accordance with the invention and the back of a seat. FIG. 6a shows the arm in a stowed position of the shelf, while FIG. 6b shows the arm in a use position of the shelf.

End 605 of arm 600, fastened to structure 110 of seat, here is slender. Rotation point 610 of arm 600 is located approximately at the upper end of arm 600.

A spring combined with a gas shock absorber, forming a combined unit 615, is used to facilitate the opening out of the arm and to ward off abrupt movements linked to the users and/or to the environment. One end of combined unit 615 is fastened to the structure of the seat, while the other end is fastened to arm 600. The point of fastening of combined unit 615 to the arm is linked to the travel of the arm and of the combined unit. According to the example presented on FIG. 6, the point of fastening of combined unit 615 to arm 600 is deported with the aid of a projection 620, so that the arm is located on the side of structure 110 of the seat, while the combined unit is positioned in structure 110 itself.

The spring of combined unit 615 is compressed when the shelf is folded and released when the latter is in use position. In this way, the force of the spring makes it possible to facilitate the movement of the arm. It therefore is necessary to exert a pressure in order to fold the arm and bring it back into its stowed position.

Arm 600 is held in its folded position when the tray of the shelf is positioned under the sitting surface. As soon as the tray is pulled out from the sitting surface, the arm automatically assumes its "high" position making it possible to use the shelf.

Alternatively, it is possible to use an electrically-controlled hydraulic system to control combined unit 615 and thus the position of arm 600.

Figure 7A:
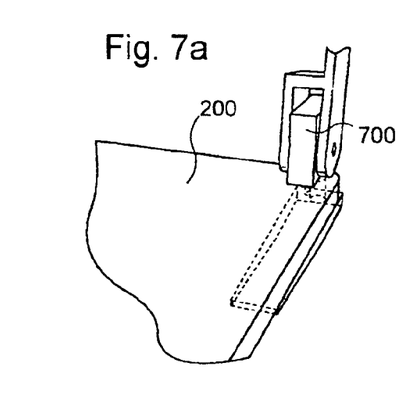
FIGS. 7a and 7b, illustrates an exemplary connecting piece that may be used for movably connecting the arm of a shelf to its tray.
Figure 7B:
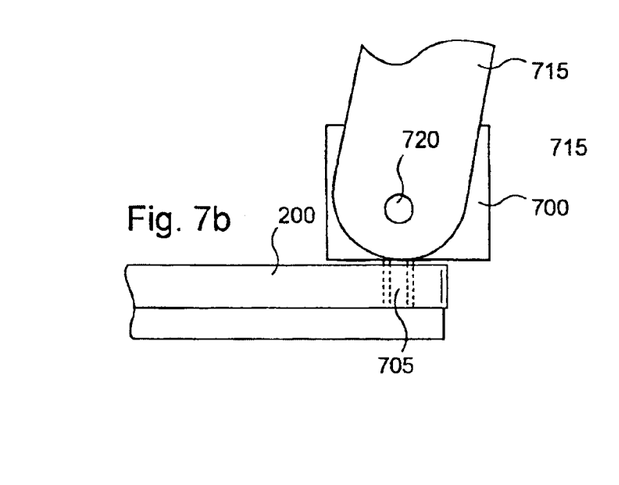

FIG. 7, comprising FIGS. 7a and 7b, illustrates an exemplary connecting piece that may be used for movably connecting the arm of a shelf to its tray. Connecting piece 700 shown allows two or three degrees of freedom to the tray in relation to the arm: two degrees of freedom in rotation and, if need be, one degree of freedom in translation.

Connecting piece 700 here consists of a component of cubic shape or of which at least two faces are parallel. Connecting piece 700 comprises a cylindrical opening between two parallel faces, more or less perpendicular to these faces.

Connecting piece 700 further comprises a cylindrical projection 705 adapted for being inserted into a cylindrical cavity of tray 200. Cylindrical projection 705 may comprise a cylindrical cavity (not shown), the axis of which is perpendicular to that of cylindrical projection 705, at its end for accommodating a fastening piece.

Connecting piece 700 also may comprise stop projections to limit movements.

Connecting piece 700 is fastened to one end 715 of the arm of a shelf by means of a cylindrical component 720. Connecting piece 700 may be positioned on the side of end 715 of the arm or, as shown, inserted into a U-shaped cavity. Connecting piece 700 thus may have a rotating movement in relation to the arm of a shelf, around the axis of cylindrical component 720.

Cylindrical projection 705 is inserted into a cylindrical cavity of the tray and held by a fastening piece. Connecting piece 700 thus may have a rotating movement in relation to the tray of a shelf, around the axis of cylindrical projection 705.

Alternatively, cylindrical projection 705 may be inserted into an oblong-shaped cavity in order to allow a rotating movement in relation to the tray of a shelf, around the axis of cylindrical projection 705, and a translatory movement linked to the oblong shape of the cavity formed in the shelf.

Connecting piece 700 is specifically adapted to the shelf such as presented in the first and third embodiments.

Figure 8A:
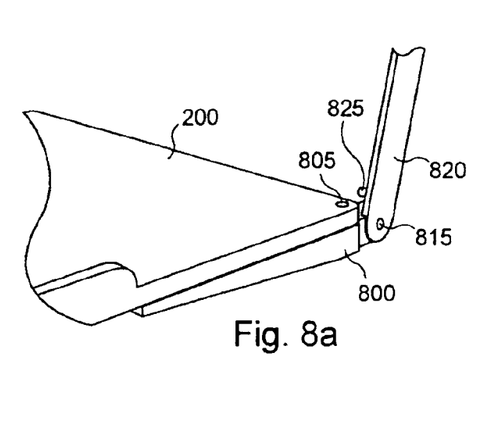
FIGS. 8a to 8c, illustrates a connecting piece that may be used between the arm and the tray of a shelf such as the one illustrated on FIG. 4.
Figure 8B:
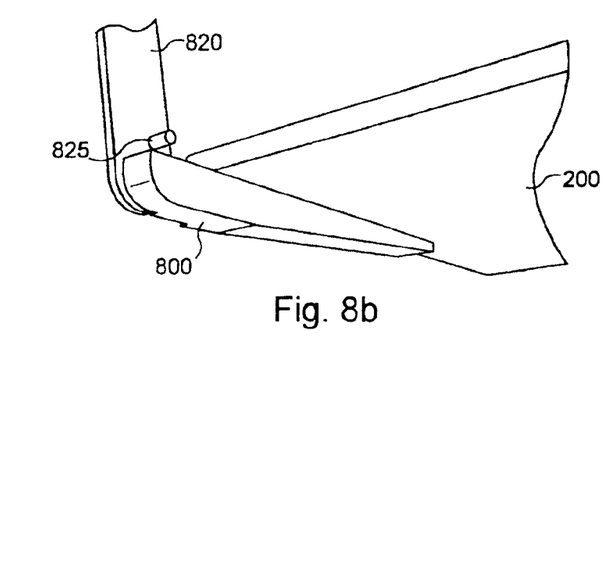
Figure 8C:
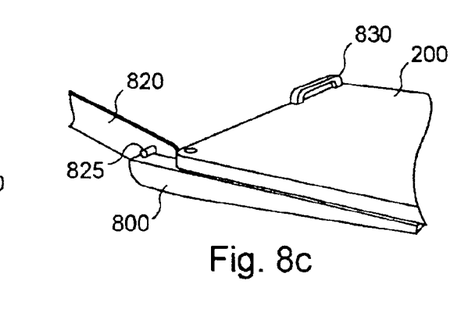

FIG. 8, comprising FIGS. 8a to 8c, illustrates a connecting piece that may be used between the arm and the tray of a shelf such as the one described in the third embodiment.

FIGS. 8a and 8b partially show a shelf in a stowed position, while FIG. 8c shows a part of the shelf in an intermediate position according to which the arm is in position for use of the shelf while the tray has not been brought back under the sitting surface.

Connecting piece 800 here is used as a tray connection and support component.

Connecting piece 800 comprises a cylindrical projection 805 adapted for being inserted into a cylindrical cavity of tray 200, perpendicular to the main plane of the tray, thus allowing the latter a rotating movement around the axis of the cylindrical projection and cavity. Alternatively, the cylindrical projection may belong to the tray, the cylindrical cavity being formed in connecting piece 800.

Connecting piece 800 also comprises a cylindrical cavity, perpendicular to the axis of cylindrical projection 805, adapted for cooperating with a cylindrical projection 815 placed at end 820 of the arm of the shelf, perpendicular to the longitudinal axis of the arm. Connecting piece 800 thus may have a rotating movement around the axis of this cylindrical cavity and projection.

Connecting piece 800 preferably further comprises a stop projection 825. In this way, when the shelf is opened out, connecting piece 800 comes to a stop on projection 825, as illustrated on FIG. 8*c*.

Tray 200 further comprises a handle 830 to facilitate manipulation thereof. Such a handle naturally may be used whatever the embodiment may be, its position being able to vary according to the configurations.

Figures 9, 11A, 11B:
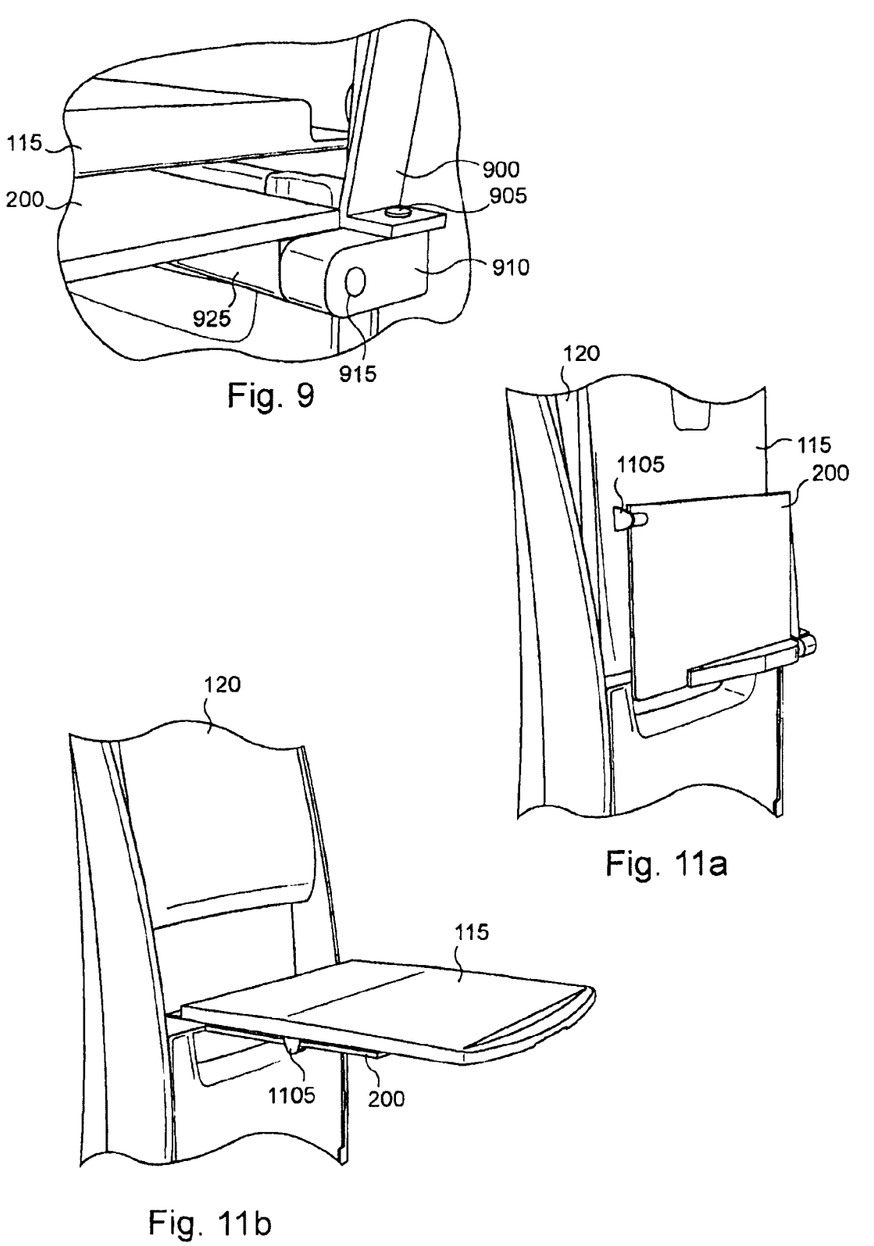
FIG. 9 presents another exemplary connecting piece that may be used for movably assembling the arm and the tray of a shelf.
FIGS. 11a and 11b, illustrates a folding seat incorporating a retractable shelf in accordance with the invention.

FIG. 9 shows another exemplary connecting piece that may be used for movably assembling the arm and the tray of a shelf.

End 900 of the arm here is extended by a cylindrical component 905. Cylindrical component 905 may be an integral part of the arm or, as shown, be added on. According to the embodiment drawn, end 900 of the arm comprises a part, approximately perpendicular to the main part of the arm, having a cylindrical cavity adapted for accommodating cylindrical component 905, in fixed or movable manner.

Connecting piece 910 comprises a first cylindrical cavity adapted for accommodating cylindrical component 905, in fixed or movable manner. It should be observed here that the cylindrical component must be movable in relation to the arm and/or connecting piece 910. The connecting piece also comprises a second cylindrical cavity, the axis of which is more or less perpendicular to that of the first cylindrical cavity, adapted for accommodating a cylindrical component 915 in movable manner.

Tray 200 here is fastened to a support 925 comprising a cylindrical projection the axis of which, parallel to the plane of the tray, is approximately perpendicular to the arm of the shelf. The cylindrical projection of the tray support is adapted for being inserted into the second cylindrical cavity of connecting piece 910.

Alternatively, the cylindrical projection of the tray support may be replaced with a cylindrical cavity into which a cylindrical component is inserted.

Connecting piece 910 allows two degrees of freedom to tray 200 relative to the arm of the shelf. In fact, tray 200 may turn around the main axis of the arm and around an axis more or less parallel to the plane of the tray and perpendicular to the arm.

Figure 10A:
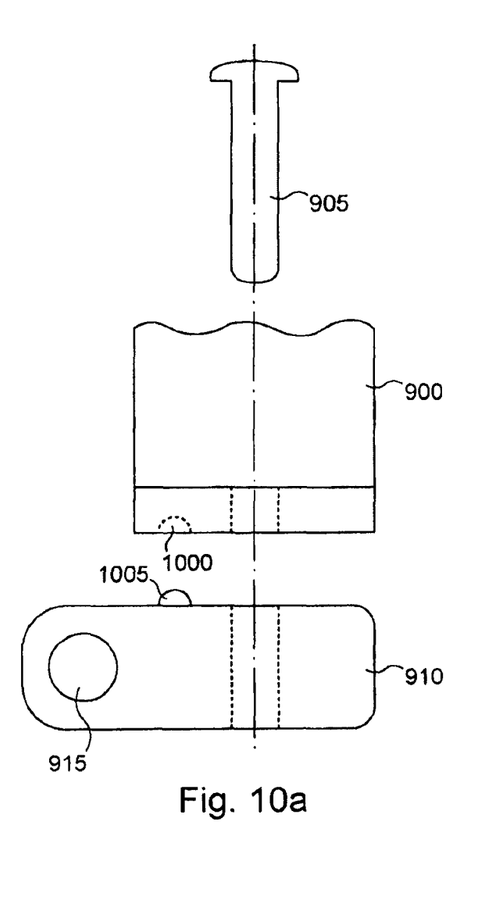
FIGS. 10a and 10b, illustrates two exemplary shelf-locking mechanisms.
Figure 10B:
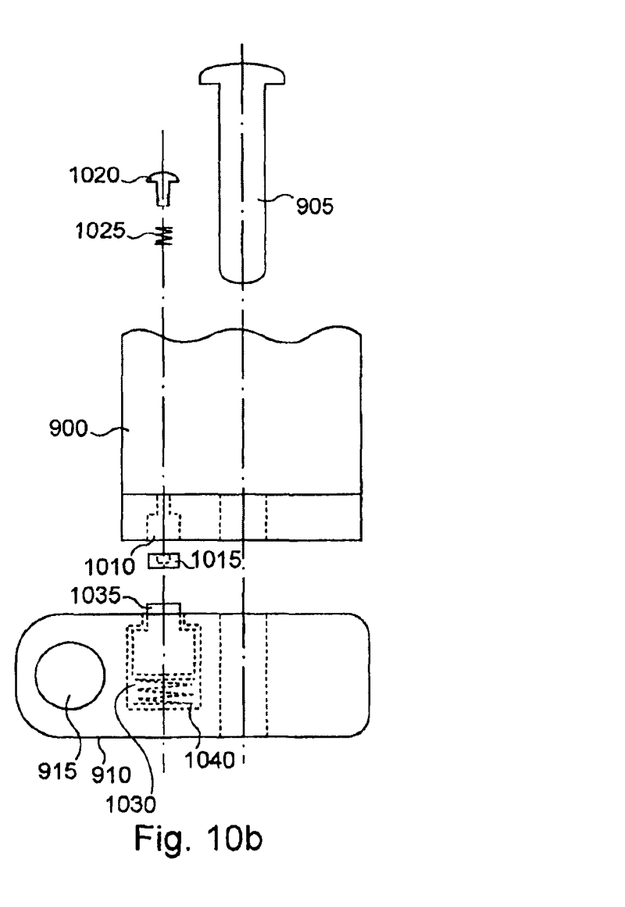

FIG. 10, comprising FIGS. 10*a* and 10*b*, illustrates two exemplary a shelf-locking mechanisms. Although these examples concern the connection between arm 900 and connecting piece 910 illustrated on FIG. 9, the principle described and illustrated may be implemented for the other embodiments and between other movable pieces.

FIG. 10*a* is an exploded side view of the lower part of arm 900 and connecting piece 910. As indicated above, the lower part of arm 900 and connecting piece 910 are held by cylindrical component 905 so that connecting piece 910 may turn around the axis of cylindrical component 905. The lower surface of the lower part of arm 900 here comprises a cavity 1000 adapted for cooperating with a lug 1005 formed on the upper surface of connecting piece 910. Cavity 1000 and lug 1005 are arranged in such a manner that when the shelf is in its stowed position and/or when the shelf is in its use position, cavity 1000 and lug 1005 are aligned along an axis more or less parallel to the axis of rotation of connecting piece 910.

Locking is achieved automatically by the pressure exerted on the surfaces of connecting piece 910 and the lower part of arm 900 in contact when cavity 1000 and lug 1005 are aligned. Unlocking results from a simple pressure exerted along an axis more or less perpendicular to the axis of rotation of connecting piece 910 and from the play existing between the lower part of arm 900 and connecting piece 910 and/or from the elasticity of the materials used for forming the lower part of arm 900 and connecting piece 910.

Alternatively, as illustrated on FIG. 10*b*, it is possible to use a locking mechanism according to which an intervention by the user is necessary for releasing.

FIG. 10*b* is an exploded side view of the lower part of arm 900 and of connecting piece 910. Again, and as indicated above, the lower part of arm 900 and connecting piece 910 are held by cylindrical component 905 so that connecting piece 910 may turn around the axis of cylindrical component 905.

The lower surface of the lower part of arm 900 here comprises an open cavity 1010 the surface of the lower opening of which is greater than that of the upper opening. Cavity 1010 advantageously is made up of two superposed cylindrical cavities.

An unlocking component 1015, the section of which is approximately equal to that of the lower cylindrical part forming cavity 1010 and the height of which is less than that of the lower cylindrical part forming cavity 1010, is positioned in the latter and rigidly fastened to a locking control component 1020, for example by screwing. Locking-control component 1029 comprises a lower part the section of which is less than that of the upper part of cavity 1010 and an upper part the section of which is greater than that of the upper part of cavity 1010.

In this way, when unlocking component 1105 and unlocking-control component 1020 are fastened to one another, they form a piece that is movable but preferably inseparable from the lower part of arm 900. Advantageously, a spring 1025 or a similar elastic component is placed between unlocking-control component 1020 and the lower part of arm 900, so that in the absence of external pressure, unlocking component 1105 is entirely positioned in the lower part of cavity 1010 and a part of cavity 1010 is free and adapted for accommodating a lock.

Connecting piece 910 comprises a cavity 1030, open toward the lower part of arm 900, inside of which there is a locking component 1035. The opening of cavity 1030 preferably is such that locking component 1035 cannot slip out of cavity 1030. Advantageously, a spring 1040 or a similar elastic component is positioned between locking component 1035 and connecting piece 910 so that in the absence of external constraint, a part of locking component 1035, forming a lock, extends beyond the surface of connecting piece 910 in contact with the lower part of arm 900. The lock formed in this way is adapted for cooperating with the part of cavity 1010 left vacant by unlocking component 1015.

Locking component 1035 and the part of cavity 1010 adapted for accommodating the lock are arranged so that when the shelf is in its stowed position and/or when the shelf is in its use position, locking component 1035 and the part of cavity 1010 adapted for accommodating the lock are aligned along an axis more or less parallel to the axis of rotation of connecting piece 910.

Locking is achieved automatically when locking component 1035 and the part of cavity 1010 adapted for accommodating the lock are aligned. Unlocking is achieved by exerting a pressure on unlocking-control component 1020. Unlocking-control component 1020 then exerts a force on locking component 1035, unlocking being achieved when the point of contact of unlocking-control component 1020 and locking component 1035 reaches the plane of contact of the lower part of arm 900 and connecting piece 910.

FIG. 11, comprising FIGS. 11a and 11b, illustrates a folding seat incorporating a retractable shelf in accordance with the invention. FIG. 11a shows the folding seat when sitting surface 115 is folded, while FIG. 11b illustrates the folding seat when sitting surface 115 is opened out, ready to be used.

The shelf is retracted on both Figures: tray 200 of the shelf is positioned against sitting surface 115, whatever the position of the latter may be. As shown, the shelf does not occupy a significant space when it is retracted. In this position, it therefore does not represent a bothersome element for the crew or the passengers.

It should be observed that sitting surface 115 of the seat here comprises a retention component 1105 adapted for holding tray 200 of the shelf against sitting surface 115 of the seat when the shelf is retracted. This retention component prevents any risk of accidental movement of the tray of the shelf.

Figure 12A:
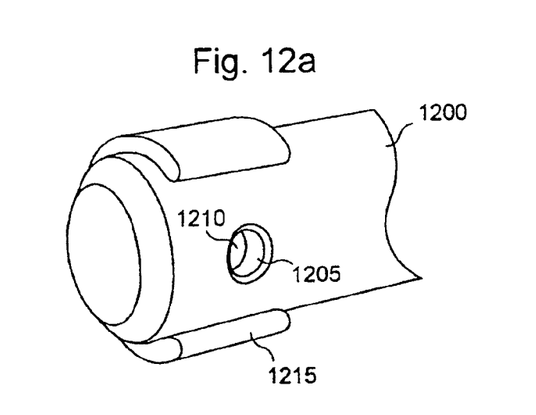
FIGS. 12a and 12b, illustrates an exemplary fastening component that may be used for assembling several components, here an arm and a seat support, with the aid of a cylindrical component; and, FIG. 13, comprising
Figure 12B:
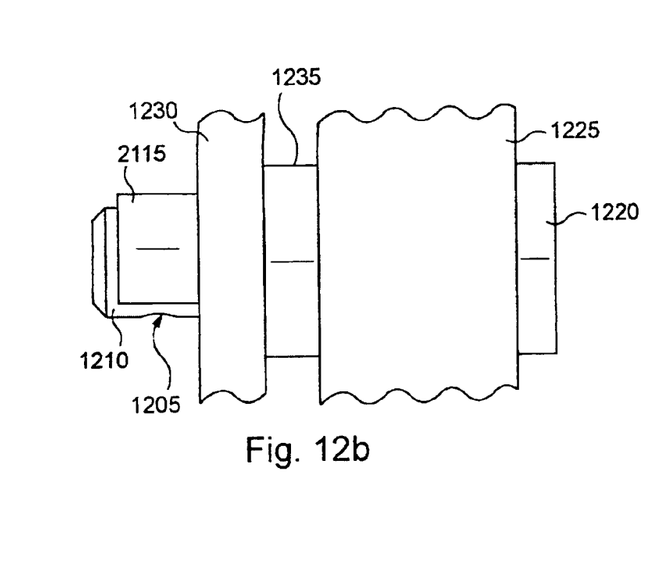

FIG. 12, comprising FIGS. 12a and 12b, illustrates an exemplary fastening component that may be used for assembling several components, here an arm and a seat support, with the aid of a cylindrical component.

FIG. 12a shows a part of a cylindrical component 1200 comprising a cylindrical cavity 1205 into which a pin 1210 is inserted and held in place by a collar 1215 rigidly fastened to pin 1210. Pin 1210 and collar 1215 form the fastening component. Collar 1215 is made of an elastic material, for example of steel or a composite material.

FIG. 12b is a side view of an assembly made with the aid of a cylindrical component. Cylindrical component 1200 here comprises a cylindrical body, a cylindrical cavity 1205 formed at one of the ends of cylindrical component 1200. The axis of cylindrical cavity 1205 is more or less perpendicular to that of cylindrical component 1200. The other end of cylindrical component 1200 comprises a head 1220 the size of which is greater than the diameter of the body of cylindrical component 1200.

The components to be assembled each comprise a cylindrical opening the diameter of which is approximately equal to that of the body of cylindrical component 1200. Advantageously, the diameter of these circular openings is slightly greater than that of the body of cylindrical component 1200 in order to facilitate the movement of the components in relation to each other.

Cylindrical component 1200 is passed into the circular opening of support 1225 for the seat and into the circular opening of arm 1230. A washer 1235 preferably is inserted between the support for the seat and the arm.

The cylindrical component is held in place by the pin rigidly fastened to collar 1215.

Figures 13A, 13B:
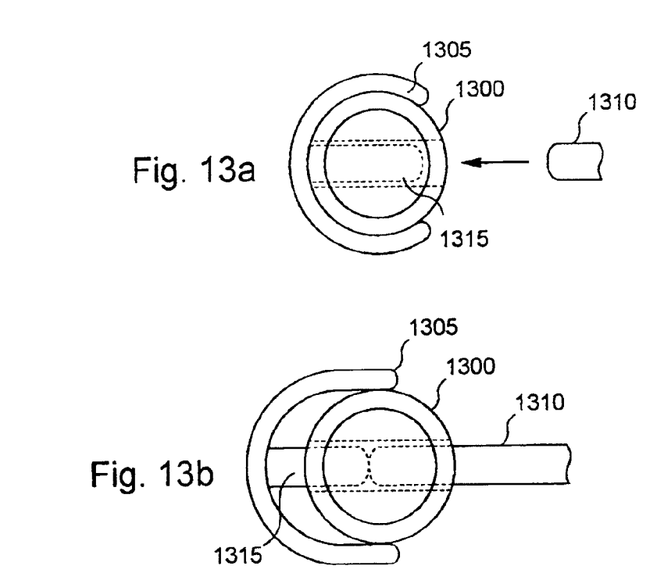
FIGS. 13a and 13c, illustrates an exemplary method that may be used for easily dismantling the fastening component shown on FIG. 12.
Figure 13C:
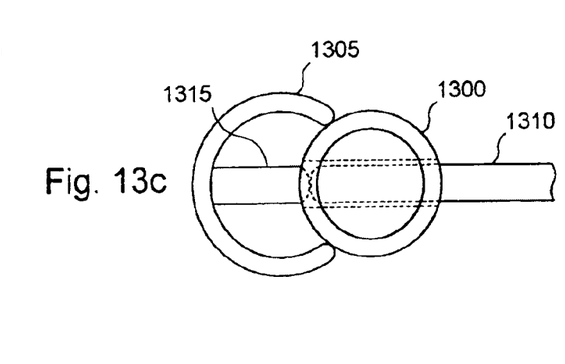

FIG. 13, comprising FIGS. 13a to 13c, illustrates an exemplary method that may be used for easily dismantling the fastening component shown on FIG. 12.

FIG. 13a shows the end of a cylindrical component 1300 on which there is mounted a fastening component 1305, seen from the front. To dismantle fastening component 1305, a rod 1310, with a diameter less than that of the cylindrical cavity formed at the end of the cylindrical component, is introduced into the cylindrical cavity formed at the end of the cylindrical component.

As illustrated on FIG. 13b, a force exerted on rod 1310 is transmitted to pin 1315 of fastening component 1305 and has the effect of pulling out pin 1315. In its movement, pin 1315 carries along the collar of fastening component 1305 which deforms in order to be pulled out from cylindrical component 1300 (FIG. 13c).

Advantageously, whatever the embodiment implemented may be, the retractable shelf according to the invention is incorporated into the folding seat during the design and manufacture of the latter. Alternatively, retractable shelves in accordance with the invention may be added onto the folding seats designed and/or manufactured earlier.

Naturally, in order to meet specific needs, an individual skilled in the area of the invention will be able to apply modifications in the foregoing description, in particular in the form of connecting pieces and systems for fastening components together.

The invention claimed is:

1. A retractable shelf device for a folding seat, the seat comprising a first movable part forming a sitting surface and a second part forming a back, the first movable part having a first folded position substantially parallel to the second part and a second opened-out position forming a substantially perpendicular angle with the second part, the device comprising:
a tray;
an arm movably fastened at one end of the arm to the second part of the seat; and
a connecting piece movably fastened to an other end of the arm and to the tray,
wherein, in a retracted position, the tray is substantially against and parallel to a first face of the first movable part when a position of the first movable part is in the first folded position, and the tray is substantially against and parallel to the first face of the first movable part when a position of the first movable part is in the second opened-out position,
wherein when the tray and the first movable part are in an opened-out position, the tray is opposite a second face of the first movable part and substantially parallel to the second face, the first and second faces of the movable part of the seat being substantially parallel and being opposite sides of the movable part of the seat, and
wherein the first moveable part includes a retention component on the first face of the first movable part, the retention component fastening the tray so that, in the retracted position, the tray remains substantially against and parallel to the first face of the first movable part during movement of the first movable part from the first folded position to the second opened-out position, and the tray remain substantially against and parallel to the first face during movement of the first movable part from the second opened-out position to the first folded position.

2. The device according to claim 1, further comprising:
a tray guide configured to guide the tray against the first movable part.

3. The device according to claim 1, further comprising:
at least one stop configured to hold the tray in a predetermined position.

4. The device according to claim 1, further comprising:
a holding device configured to hold the arm in a predetermined position.

5. The device according to claim 1, further comprising:
an elastic device configured to bias movement of the arm in a predetermined direction.

6. The device according to claim 1, further comprising:
a fastener configured to cooperate with at least one cylindrical component of the tray for connecting the connecting piece to the tray.

7. A folding seat for a commercial aircraft flight personnel, comprising a device according to claim 1.

* * * * *